(12) United States Patent
Dehlinger et al.

(10) Patent No.: US 8,483,661 B2
(45) Date of Patent: Jul. 9, 2013

(54) METHOD FOR LOADING CREDENTIALS INTO A MOBILE COMMUNICATION DEVICE SUCH AS A MOBILE PHONE

(75) Inventors: Franck Dehlinger, Meudon (FR); Francois-Xavier Marseille, Meudon (FR); Laurent Castillo, Meudon (FR)

(73) Assignee: Gemalto SA, Meudon (FR)

( * ) Notice: Subject to any disclaimer, the term of this patent is extended or adjusted under 35 U.S.C. 154(b) by 0 days.

(21) Appl. No.: 12/746,764

(22) PCT Filed: Dec. 2, 2008

(86) PCT No.: PCT/EP2008/066635
§ 371 (c)(1),
(2), (4) Date: Sep. 10, 2010

(87) PCT Pub. No.: WO2009/071544
PCT Pub. Date: Jun. 11, 2009

(65) Prior Publication Data
US 2011/0028125 A1    Feb. 3, 2011

(30) Foreign Application Priority Data
Dec. 7, 2007   (EP) .................................... 07291469

(51) Int. Cl.
*H04M 1/66* (2006.01)
(52) U.S. Cl.
USPC ......... 455/411; 455/412.1; 455/557; 455/558

(58) Field of Classification Search
USPC ............... 455/558, 406, 407, 551, 410–412.1
See application file for complete search history.

(56) References Cited

U.S. PATENT DOCUMENTS

| | | | | |
|---|---|---|---|---|
| 5,675,628 A * | 10/1997 | Hokkanen | ...................... | 455/433 |
| 7,912,497 B2 * | 3/2011 | Isidore et al. | .............. | 455/552.1 |
| 2005/0096087 A1 * | 5/2005 | Kim | ............................... | 455/558 |
| 2005/0282584 A1 * | 12/2005 | Faisy | ............................ | 455/558 |
| 2007/0178938 A1 * | 8/2007 | Kravitz et al. | ................ | 455/558 |
| 2008/0032743 A1 * | 2/2008 | Lee | ............................... | 455/558 |
| 2010/0291898 A1 * | 11/2010 | Sanding et al. | ............... | 455/411 |

FOREIGN PATENT DOCUMENTS

| | | |
|---|---|---|
| GB | 2365699 A1 | 2/2002 |
| SE | WO9959360 A | 11/1999 |
| WO | WO2004025921 A | 3/2004 |
| WO | WO2004100582 A | 11/2004 |
| WO | WO2005119931 A | 12/2005 |

* cited by examiner

*Primary Examiner* — Chuong A Ngo
(74) *Attorney, Agent, or Firm* — Pehr B. Jansson; The Jansson Firm

(57) ABSTRACT

The invention relates to a personal token (10) for being associated with a mobile telecommunication device (20) and for storing credentials for access to an operator's network, characterized that the personal token (10) is arranged for loading the credentials into a memory (23) of the mobile telecommunication device (20), so that the mobile telecommunication device (20) is taken away from the personal token (10) and operative for connecting to the operator's network with the credentials in its memory (23).

10 Claims, 1 Drawing Sheet

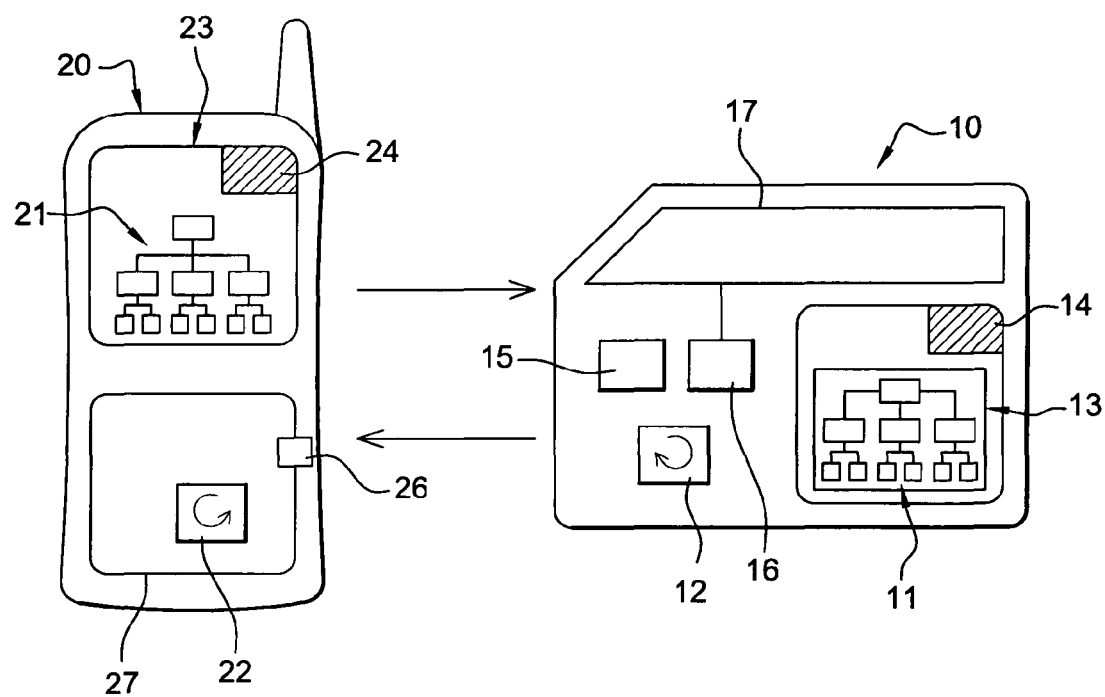

METHOD FOR LOADING CREDENTIALS INTO A MOBILE COMMUNICATION DEVICE SUCH AS A MOBILE PHONE

BACKGROUND OF THE INVENTION

1. Field of the Invention

The invention relates to mobile communications and to personal tokens carrying credentials for access to such mobile communications.

The invention relates in particular to smart cards and mobile phones associated therewith, but many other personal tokens may replace the smart card, such as USB tokens, mass memory cards, USB enabled SIMs. The invention relates in particular to mobile voice communication and to other types of mobile communications such as videoconference, mobile internet, mobile TV or mobile broadcasting.

2. Description of the Related Art

The personal tokens used for access to mobile communications are usually considered as representing the operator identity to the end-user. They contain the credentials for access to the network of the operator, and specific applications of the operator.

Moreover, the personal token is usually considered as a device that should be easily separated from the handset and plugged into another. Thanks to the personal token, the operator can keep a certain level of independence regarding the handset maker.

From the handset point of view, the smart card is a simple external container hosting credentials, performing basic cryptographic operations, and storing some user specific data such as phonebook entries. For a handset manufacturer, the SIM card is just another peripheral, performing tasks that he could easily do itself and would like to do itself for reducing the cost and complexity inherent to association of personal tokens with mobile devices.

The invention aims at proposing an alternate scheme to usual personal tokens which alternate scheme allows to keep the portability benefits of usual personal tokens and reduces the cost and complexity inherent to association of personal tokens with mobile devices.

This purpose is achieved by means of the invention as recited in the appended claims.

BRIEF DESCRIPTION OF THE DRAWINGS

Other purposes, aspects, and benefits of the invention will appear throughout the following description, which is made in reference to the figures, among which:

FIG. 1 depicts a personal token according to an embodiment of the invention;

DETAILED DESCRIPTION OF THE INVENTION

The smart card 10 of FIG. 1 is a 7816-3 shaped smart card, containing a set of necessary data for connection to a mobile operator's network. The card comprises a secret key, which is necessary for responding to a key challenge from the operator. The key challenge consists in a random being sent to the device and a specific response being sent in response using the secret key. The key is well known by the operator having sent the key challenge so that the response to be sent is expected by the operator.

The card 10 comprises the cryptography algorithm which is necessary for computing the response to the key challenge by making use of the secret key.

In addition to the secret key and the authenticating algorithm the card 10 stores a set of administrative data 11, organized in the memory of the smart card 10 in a tree-shaped structure.

Those administrative data comprise name of the mobile operator, IMSI, i.e. International Mobile Subscriber Identifier, ICCID, MSISDN i.e. subscriber dialing number attached to the card, etc. . . . All these administrative data may be named the GSM file system due to its tree-shaped type of organization 11.

IMSI, KI, ICCID, MSISDN and any other data inherent to the specific smart card may be considered as credentials which are necessary for the mobile phone to connect to the network. The remaining usual data necessary for connecting to the network and which are stored in the tree-shaped structure are considered as administrative data, i.e. data that are not inherent to the particular end-user.

The present smart card 10 comprises an engine 12 for loading the different above mentioned administrative data and credentials into a handset, i.e. more precisely for copying the said information to the memory of a handset.

For this purpose, the card 10 is associated with a handset 20 having a mirror engine 22. The mirror engine 22 is able to read the credentials and administrative data in the card 10 and store them in a protected area 23 of the memory of the handset 20 which is configured for storing such information. Further fetching of administrative information and credentials is performed by the handset 20 in its own memory at each new power-on of the mobile handset 20, and a new connection of the handset 20 to the mobile network is permitted.

The transfer engine 12 of the card fetches the credentials and administrative data from the protected memory 13 of the card 10 and from a particularly secure part 14 of the protected memory 13 which stores the secret key Ki and copies them into a buffer 15 of the card, and then activates a modulator 16 for the modulator to modulate the credentials and administrative data on an antenna 17 of the card once a triggering signal and a corresponding magnetic energy is received from the handset 20.

The handset engine 22 triggers a modulator 26 of the antenna 27 of the handset 20 for sending a modulated magnetic signal to the card 10 which provides the necessary power to the card for sending back the credentials and administrative data. The handset engine 22 further reads the data that are received by the handset 20 and are demodulated by the demodulator 26 of the handset, and the engine 22 then routes the credentials and administrative data to corresponding parts of the memory of the handset, thereby reconstructing the tree-structure in a protected part of the memory 23 of the handset which tree-structure comprises the administrative data and the IMSI, ICCID, MSISDN and other credentials apart from the secret key Ki, and placing the Ki value on a particularly secure part 24 of the protected memory 23. The protected memory 23 is in particular protected against DPA and repetitive type attacks.

Of course, many other schemes are possible for a card to make its administrative data and credentials or a copy thereof ready for a transfer to the handset, which may comprise use of a buffer or not, read commands originating from the handset or not, making the data available in the form of packets or in the form of a continuous flow of data, requiring an authentication for each packet of data or requiring an authentication for the whole set of data, the card may send a signal to the handset indicating that the data are ready or the handset may send a repetitive requiring signal for the data until the data are ready, etc.

Both the handset 20 and the card 10 comprise authentication modules for a mutual authentication prior to the credentials and administrative data to be loaded. Authentication of the smart card 10 by the handset 20 allows the handset to protect itself from accepting any information which may be fraudulous into its secured area, and prevents the handset from accepting smart cards which may originate from a mobile operator for which the handset is not intended.

Authentication of the handset 20 by the card 10 allows the card to ensure that the handset is a secure and authorized device and not a device originating from a fraudulous entity the purpose of which is to fraudulously use the credentials of the smart card.

The authentication may be based on a handset based list of identifiers for authorized IMSIs, and on a smart card based list of authorized handsets, for example a list of IMEIs—International Mobile Equipment identifiers—of authorized handsets.

Once mutual authentication is performed, the credentials and the administrative data are read from the card and loaded onto the handset, more precisely here copied from card to handset.

In the present embodiment, the card is a contactless card, i.e. a card having an embedded antenna and able to transfer information by magnetic modulation through this antenna, for example by means of an embedded modulator coupled with the antenna.

The handset is enabled for contactless communications with the card, i.e. it is equipped here with an antenna and a modulator for receiving and sending information from and to the card.

The communication between the card and the handset may be made through electrical contacts, either inside a usual slot for SIM cards, either in a specific slot, such as a USB female connector for a USB key as a personal token.

The transfer of information through contactless communication is encrypted by means of a common encrypted key, particular to the handsets and cards of the consider mobile operator and which is pre-memorized in the card and the handset.

In an alternate encryption embodiment for the secured transfer of information, a shared secret is created at the time the card and the token get connected each other, which consists in a real-time created encryption key that is used for such transfer only. Hence the shared secret is not known by any other device so that no other device is able to spy the transfer of information, due to the fact that the encryption key has not been pre-stored in any memory but has been created especially for the transfer of information at the time of it.

As described above, the shared secret is generated for example with a random generator hosted in the handset, which may alternately be hosted in the card and which generates a random then adopted as the secret key and transmitted therefore to the card where it is stored in a secure part of the memory of the card.

Once the credentials and the administrative data are loaded onto the handset, the card can be taken away from the handset. The credentials and the administrative data are stored in a protected part of the memory of the handset, and the secret key Ki is stored in a particularly secure part of the protected memory. The protected memory is protected against different types of attacks, such as DPA ( . . . ) attacks, laser attacks, multiple queries attacks, etc.

Secure memory hardware for a handset may be bases on the TPM ( . . . ) technology, or a technology such as the one used in contactless payment applications for mobile phones.

Although the administrative data are loaded onto the card with the credentials in the present example, in an alternate embodiment the handset is pre-stored with the administrative data for at least one operator. In such case the credentials are the only necessary data to be loaded onto the handset.

The transfer of credentials and/or administrative data may be considered as a personalization of the handset, in the same way as personalization is performed onto a card in a card manufacturer's factory.

The present card is enabled for depersonalizing the handset by momentarily associating the card with the handset, i.e. by getting the card close to the handset.

Preferably, for the benefit of interoperability among any type of handset and card, data exchanges between the card and the handset, as performed during personalization and depersonalization, should be done through a generic API—application programming interface.

The handset 20 can be depersonalized only by the card 10 which has personalized it.

As described above, at the end of the transfer of the credentials and administrative data, the card also gets locked into a state which prevents the card from personalizing any other handset. The card 10 can be unlocked into the original state, i.e. the state where the card 10 is available for personalizing a handset, only if it is associated again with the personalized handset 20. The handset 20 gets depersonalized by such new associating step.

Preventing the card 10 from personalizing another handset prevents a potential thief of the card to personalized a plurality of handset, which would become a fraudulous handset for each of them.

Locking of the handset from being depersonalized prevents that the handsets looses its unlocking ability, which would induce that the card can no more be used because no more possibility would exist to use it for personalizing of a new handset.

Furthermore, locking the handset 20 prevents a thief from being tempted to steel the handset in order to sell it for being used with new credentials. The handset 20 would then refuse any further personalization, and the account of the end-user corresponding to original credentials would be locked at the operator's size, thereby definitely blocking the personalized and locked handset.

A flag is stored in a secure memory of the card 10, which flag can not be reached by any non-authorized device, which flag gets into a status which indicates to the processor of the card that is no more able to transfer any credential to any external device.

The same mechanism exists in the handset 20, i.e. a flag in a secure part of the memory of the handset 20 indicates to the processor of the handset that it is not authorized to get rid of the credentials which are stored in the memory of the handset.

For the handset, the locking flag can be modified only if the card 10 which has been associated therewith is once again associated therewith. For the card 10, the locking flag can be modified only if the handset 20 which has been associated therewith is once again associated therewith again.

Any of these two lockings is independent of the other, and in alternate embodiments, only one of these two lockings, or not lockings, may be implemented.

In order to depersonalize the handset 20, the card 10 is brought in close area to the handset, in the same way as a contactless card in brought close to a contactless reader, and the depersonalizing process starts immediately.

For the purpose of securing the depersonalizing of the handset, the card and the handset generate a shared secret key while they are associated for the personalizing and this shared secret is memorized inside the handset and the card. The shared secret is generated only for the purpose of the associated one-time personalizing and the associated one-time depersonalizing of the handset, i.e. it is generated at the time the card and handset are associated for the first time, and it did not exist prior to the association of the card with the handset.

Once the card 10 is in close vicinity with the handset 20, the handset detects presence of the card and then checks whether the card stores the shared secret. The handset 20 sends a random data to the card and waits for the result of a predetermined calculation which makes use of the shared secret, which result is already known by the handset because it stores the same shared secret. If the result sent by the card 10 to the handset 20 is the one which is expected, then the card 10 is recognized by the handset 20.

In a same way, the card 10 checks whether the handset 20 stores the shared secret. The card sends a random data to the handset and waits for the result of a predetermined calculation which makes use of the shared secret, which result the card already knows because the card stores the same shared secret. If the result sent by the handset to the card is the one which is expected, then the handset is recognized by the card.

After this mutual recognition, the credentials and/or administrative data are extracted from the handset, i.e. the credentials get deleted from the memory of the handset 20. The credentials and/or administrative data may be written back into memory of the card or may be simply deleted from the memory of the handset, especially in the present case where credentials and/or administrative data were not suppressed from the memory of the card at the original transfer of credentials and/or administrative data from card to handset.

In addition, a transfer of personal data is carried out at the depersonalization step, which consists in copying personal data from card to handset and deleting them from the handset. These personal data are generated during the use of the handset while being used under personalization with the current card.

Such personal data comprise entries of a phonebook as stored by the end-user in the memory of the handset, contents of SMSs received and sent, content of MMS, photo portfolios, etc. . . . Such use of the card for backing up personal data allows to provide the same portability as a usual card hosted inside a handset. When the owner of the present card associates the card with a new phone, the credentials, administrative data, and personal data are transferred to the new phone in the frame of the personalization of the new handset.

In the present embodiment, the memory of the card 10 comprises a section which is dedicated to storing applications, such as java applets, gathered in java packages, or any kind of midlets. The content of this section of the memory of the card is downloaded into the memory of the handset 20 during the above described personalization, and a considered downloaded application is activated by the handset 20, for example when the operator sends an activating command to the handset at any time after personalization.

The such applications content is deleted from the handset 20 at the above described depersonalization step.

The invention claimed is:

1. A method to associate to a mobile telecommunication device some credentials for connecting to an operator's network, the method comprising:
providing a personal token having a memory;
uniquely associating the personal token to the mobile telecommunication device and loading the credentials from the personal token memory to a memory of the mobile telecommunication device associated with the personal token;
upon having loaded the credentials from the personal token memory disallowing loading credentials from other personal tokens into the memory of the mobile telecommunications device uniquely associated with the personal token and disallowing loading credentials from the personal token into other mobile telecommunications devices;
taking the personal token away from the mobile telecommunication device;
operating the mobile telecommunication device to connect to the operator's network using the credentials in the mobile telecommunication device memory without the use of a personal token to store the credentials.

2. The method according to claim 1 wherein loading the credentials from the personal token memory to the mobile telecommunication device memory is performed by contactless communication between the personal token and the mobile telecommunication device.

3. The method according to claim 1 or claim 2 further comprising the step of carrying out a change a value of a status flag stored in the personal token memory of the personal token which prevents the personal token from a further loading of credentials into a further mobile telecommunication device once the credentials have been loaded into the said mobile telecommunication device.

4. The method according to claim 1 or 2, further comprising:
associating the personal token with the mobile telecommunication device;
authenticating in the mobile telecommunication device that the personal token has been associated therewith previously; and
allowing in the mobile telecommunication device that the credentials be extracted thereof after the mobile telecommunication device has authenticated that the personal token has been associated therewith previously.

5. The method according to claim 4, further comprising operating the personal token to authenticate the mobile telecommunication device for allowing extraction of the credentials from the mobile telecommunication device.

6. The method according to claim 5, wherein the step of loading the credentials further comprises generating a shared secret in the personal token and the mobile telecommunication device and the method further comprising using said shared secret for said authentication allowing the extraction of the credentials.

7. The method according to claim 1 or 2, further comprising transferring personal data generated by the end-user from the mobile telecommunication device to the personal token at the time of extraction of the credentials.

8. The method according to claim 1 or 2, further comprising transferring at least an application from the personal token memory to the mobile telecommunication device memory.

9. The method according to claim 1 or 2 wherein the personal token is a smart card.

10. A personal token for being associated with a mobile telecommunication device and for storing credentials for access to an operator's network, comprising means for loading the credentials into a memory of the mobile telecommunication device, so that if the mobile telecommunication device is taken away from the personal token the mobile telecommunication device remains operative for connecting to the operator's network by using the credentials in mobile telecommunication device memory without the use of a personal token to store the credentials; and means for disallowing loading credentials from other personal tokens into the memory of the mobile telecommunications device upon having loaded the credentials from the personal token memory.

\* \* \* \* \*